United States Patent
Toyoda

[11] Patent Number: 5,917,557
[45] Date of Patent: Jun. 29, 1999

[54] AUDIO/VIDEO SYSTEM SELECTOR

[75] Inventor: Takashi Toyoda, Tokyo, Japan

[73] Assignee: Sony Corporation, Tokyo, Japan

[21] Appl. No.: 08/679,306

[22] Filed: Jul. 12, 1996

[30] Foreign Application Priority Data

Jul. 14, 1995 [JP] Japan .................................. 7-200277

[51] Int. Cl.$^6$ .................................................. H04N 7/08
[52] U.S. Cl. ......................... 348/705; 348/468; 348/484; 348/485; 348/722
[58] Field of Search .................................. 348/468, 484, 348/485, 584, 705, 706, 722, 564, 462, 461, 565, 569, 589, 15, 481, 482, 483; H04N 7/08, 7/087

[56] References Cited

U.S. PATENT DOCUMENTS

| | | | |
|---|---|---|---|
| 4,780,758 | 10/1988 | Lin | 358/86 |
| 4,903,129 | 2/1990 | Bell | 358/181 |
| 4,924,303 | 5/1990 | Brandon | 358/86 |
| 5,353,064 | 10/1994 | Schlink | 348/468 |
| 5,418,782 | 5/1995 | Wasilewski | 348/906 |
| 5,532,753 | 7/1996 | Buchner | 348/569 |
| 5,548,346 | 8/1996 | Mimura et al. | 348/738 |
| 5,644,362 | 7/1997 | Cornelis | 348/468 |
| 5,694,163 | 12/1997 | Harrison | 348/13 |
| 5,734,436 | 3/1998 | Abe et al. | 348/564 |

FOREIGN PATENT DOCUMENTS

| | | | |
|---|---|---|---|
| 9610258-7 | 7/1996 | Australia | H04Q 3/00 |
| 0445715 | 11/1991 | European Pat. Off. | |
| 445715A2 | 9/1991 | Germany | H04N 07/87 |
| 9013204 | 11/1990 | WIPO | |
| WO 90/13204 | 11/1990 | WIPO | H04N 7/087 |

*Primary Examiner*—John K. Peng
*Assistant Examiner*—Wesner Sajous
*Attorney, Agent, or Firm*—Jay H. Maioli

[57] ABSTRACT

A component system includes a selector connected to at least one audio component, at least one video component includes a teletext receiver wherein audio and video signals output by the audio and video components as well as the teletext receiver can be selected, and when an operation to switch from an already selected component to the teletext receiver is carried out, a video signal produced by the teletext receiver is selected and output with an audio signal produced by the previously selected component remaining selected and output, allowing information transmitted by a teletext to be obtained without interrupting the audio signal being output by the previously selected component.

10 Claims, 4 Drawing Sheets

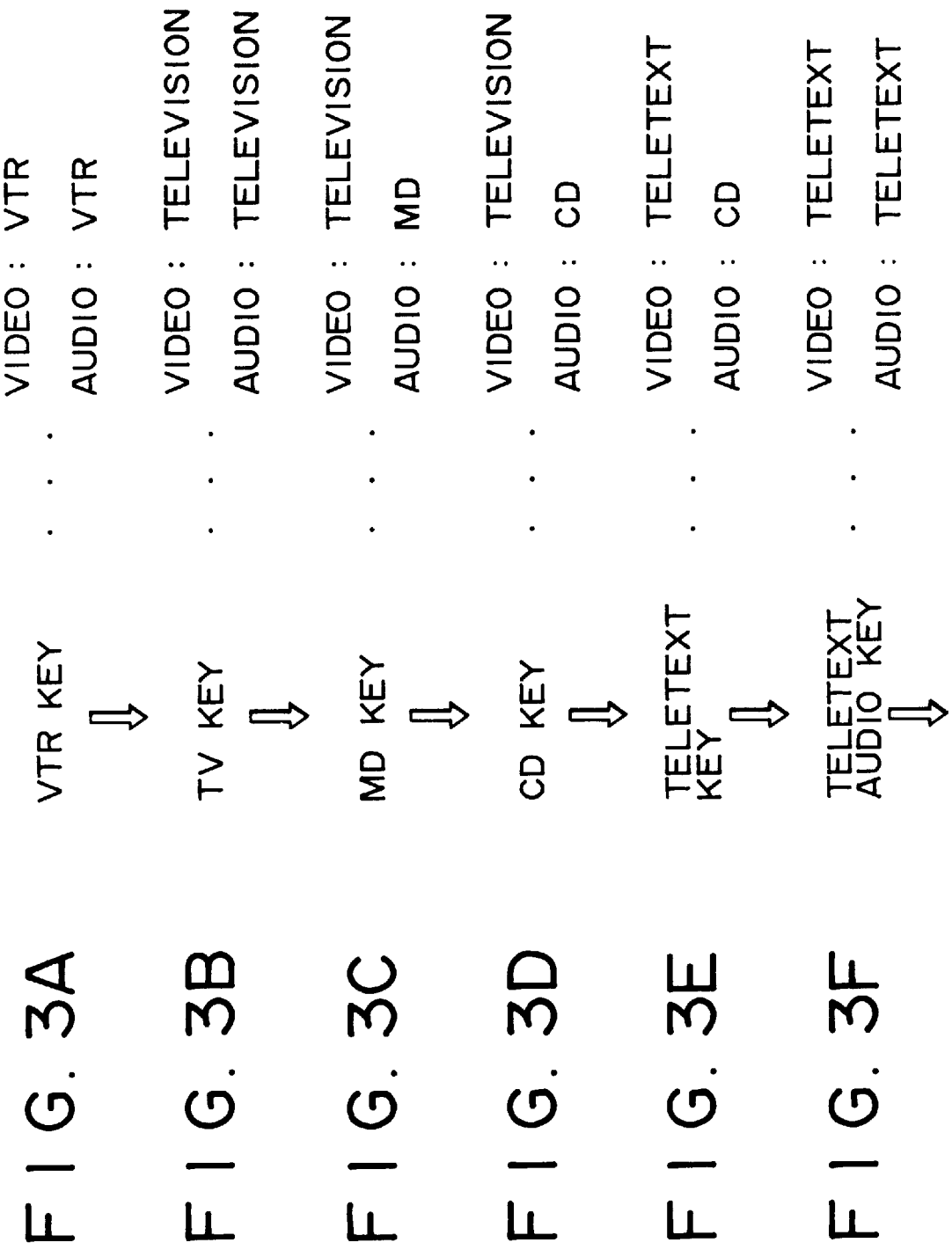

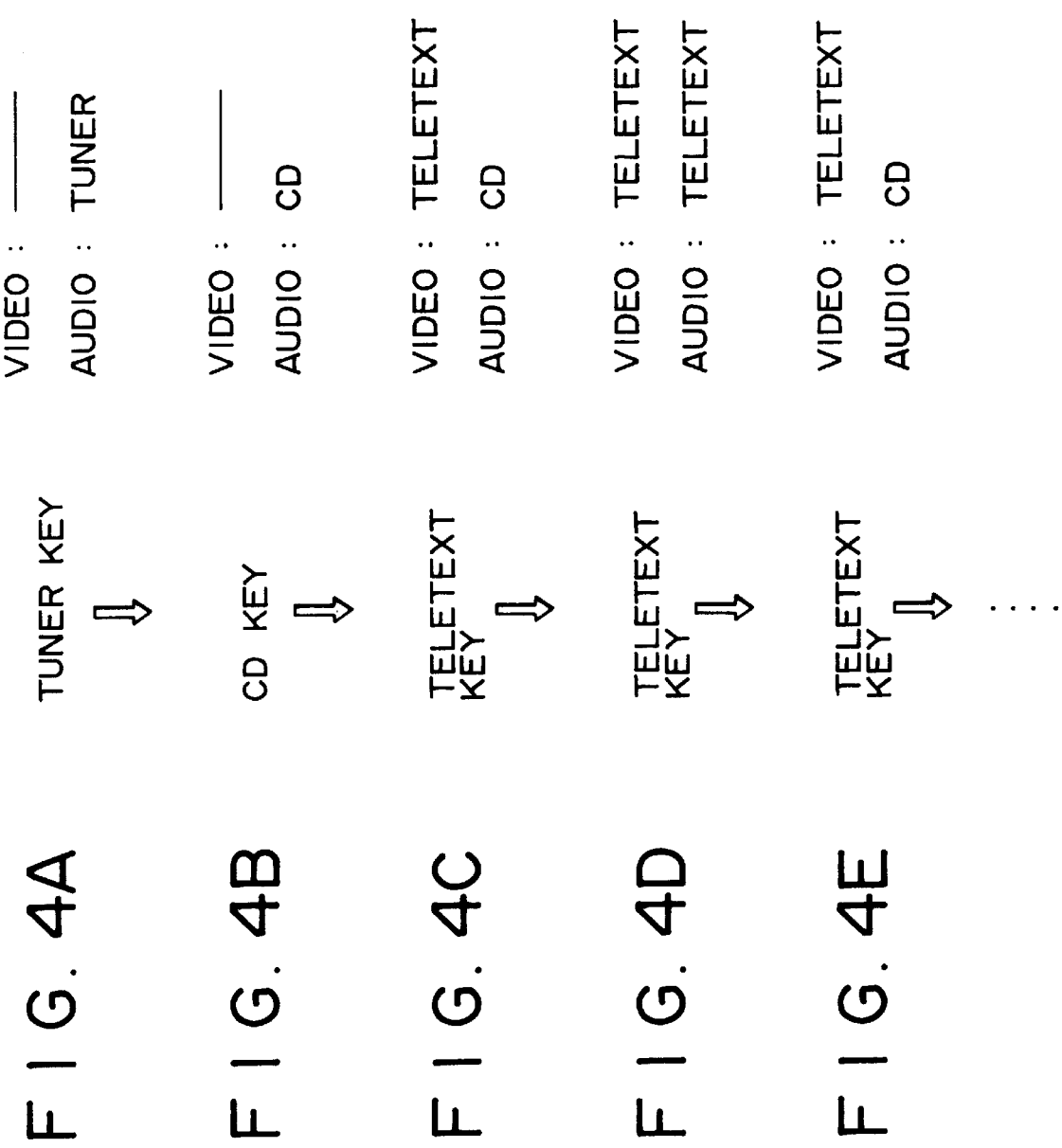

AUDIO/VIDEO SYSTEM SELECTOR

FIELD OF THE INVENTION

The present invention relates to a selector of an audio/video system.

BACKGROUND OF THE INVENTION

The variety of audio/video sources has increased in number in recent years. In general, a selector function is added to an AV (Audio Visual) amplifier or the like which is used as a component in building an AV system for handling these sources in an integrated control manner.

The selector receives audio signals generated typically by audio sources such as a compact disc player referred to hereafter simply as a CD player, a minidisk player referred to hereafter simply as an MD player and an AM/FM tuner in addition to video and audio signals generated by video/audio sources such as a television tuner referred to hereafter simply as a TV tuner, a video recorder referred to hereafter simply as a VTR, a laser disk player and a video CD player. By carrying out predetermined operations, a signal selected from the audio and video/audio signals supplied by these sources to the selector can be output.

Let, for example, video and audio signals supplied from a TV tuner be selected at the present time. When it is desired to switch from these video and audio signals to other signals, a select key or the like provided on an operation unit is operated. In this way, it is possible to switch from these video and audio signals to other signals at the same time by carrying out one operation.

In addition, video and audio signals can be selected from video and audio sources independently of each other. To put it in more detail, for example, it is possible to select an audio signal supplied from a CD player and a video signal generated by a TV tuner as a BGV (Back Ground Video) at the same time.

In this case, however, if video and audio signals are selected in a completely independent manner, one signal must be selected after another, giving rise to poor operability. This is because the signals are selected one after another by carrying out two seperate select operations. In order to improve the operability, an audio select mode is provided. In the audio select mode, with a TV tuner producing video and audio signals, an audio signal selected from, for example, a CD player or an MD player outputting only an audio signal can be selected so as to switch the AV system from the audio signal supplied by the TV tuner to the audio signal generated by the CD player or the MD player, leaving the video signal generated by the TV tuner untouched as it is.

By the way, a broadcasting system which allows character data of an independent program to be transmitted by superposition typically on a video signal of a TV broadcast has been implemented in recent years.

In a teletext, one program comprises typically several pages of character data. A teletext receiving unit receives such a superimposed video signal of the TV broadcast and demodulates the signal to produce the character data. Subsequently, a video signal conveying character transmission screens corresponding to the pages is generated. Then, the video signal is supplied to a monitor unit for displaying the character transmission screens on a monitor screen, allowing various kinds of information to be obtained.

In some cases, the teletext may include audio information added as BGM (Back Ground Music) of the screen as is the case with "karaoke". In such a case, the teletext receiving unit outputs video and audio signals. Thus, by supplying the video and audio signals supplied by the teletext receiving unit to a selector, it is possible to watch screens of the teletext and listen to the audio output thereof in the AV system.

For example, let the user temporarily select a teletext by means of a selector in order to watch a weather forecast or traffic information while the user is listening to music produced by a CD or MD player. Since a teletext comprises signals generated by both audio and video sources, however, switching both video and audio signals being reproduced by an AV system to the signals of the teletext will give rise to a problem that the audio signal being played back by a CD or MD player is inadvertently suspended and the audio signal of the teletext is reproduced instead, resulting in an unpleasant feeling.

In this case, the AV system can of course be switched back from the audio signal of the teletext to the audio signal reproduced by the CD or MD player. In this case, in order to watch the weather forecast or the traffic information of the teletext, two seperate switching operations must therefore be carried out as described above, giving rise to a problem caused by the troublesome operation to switch back to the audio signal reproduced by the CD or MD player.

SUMMARY OF THE INVENTION

In order to solve the problems described above, the present invention provides a component system comprising:
  reception means for receiving a teletext;
  teletext equipment having teletext modulating means for modulating a video signal and an audio signal of a teletext received by the reception means;
  a plurality of audio components for demodulating audio signals;
  a plurality of video components for demodulating video signals;
  audio signal selecting means for selecting an audio signal among outputs of the audio and video components and the teletext equipment;
  video signal selecting means for selecting a video signal among outputs of the audio and video components and the teletext equipment;
  source selecting means for selecting one component among the audio and video components and the teletext equipment; and
  control means whereby, when the source selecting means are requested to select the teletext equipment in place of one of the audio and video components already selected, only the video signal selecting means are controlled to select a video signal output by the teletext modulating means and control is exercised so as to sustain an audio signal output by the audio or video component already selected.

In addition, the present invention also provides a selector connected to a plurality of audio components, a plurality of video components and a teletext receiver wherein an audio signal and a video signal output by the audio and video components can be selected, the selector comprising:
  audio signal selecting means for selecting an audio signal among outputs of the audio and video components and the teletext equipment;
  video signal selecting means for selecting a video signal among outputs of the audio and video components and the teletext equipment;
  source selecting means for selecting one component among the audio and video components and the teletext equipment; and control means whereby, when the source selecting means are requested to select the teletext equipment in place of one of the audio and video components already selected, only the video signal selecting means are controlled to select a video signal output by the teletext modulating means and control is exercised so as to sustain an audio signal output by the audio or video component already selected.

BRIEF DESCRIPTION OF THE DRAWINGS

FIG. 3A shows video and audio signals which are output when the operation unit provided by the present invention is operated to select a VTR;

FIG. 3B shows video and audio signals which are output when the operation unit provided by the present invention is operated to switch from the selected VTR to a TV receiver;

FIG. 3C shows video and audio signals which are output when the operation unit provided by the present invention is operated to switch from the selected TV receiver to an MD player;

FIG. 3D shows video and audio signals which are output when the operation unit provided by the present invention is operated to switch from the selected MD player to a CD player;

FIG. 3E shows video and audio signals which are output when the operation unit provided by the present invention is operated to switch from the selected CD player to a teletext;

FIG. 3F shows video and audio signals which are output when the operation unit provided by the present invention is operated by pressing a teletext audio key with the teletext selected;

FIG. 4A shows video and audio signals which are output when the operation unit provided by the present invention is operated to select an AM/FM tuner;

FIG. 4B shows video and audio signals which are output when the operation unit provided by the present invention is operated to switch from the selected AM/FM tuner to a CD player;

FIG. 4C shows video and audio signals which are output when the operation unit provided by the present invention is operated to switch from the selected CD player to a teletext;

FIG. 4D shows video and audio signals which are output when the operation unit provided by the present invention is operated by pressing a teletext key once more with the teletext selected; and FIG. 4E shows video and audio signals which are output when the operation unit provided by the present invention is operated by pressing the teletext key once more with the teletext selected.

DETAILED DESCRIPTION OF THE EMBODIMENTS

The present invention will become apparent from the following detailed description of preferred embodiments with reference to accompanying diagrams.

Figure 1:
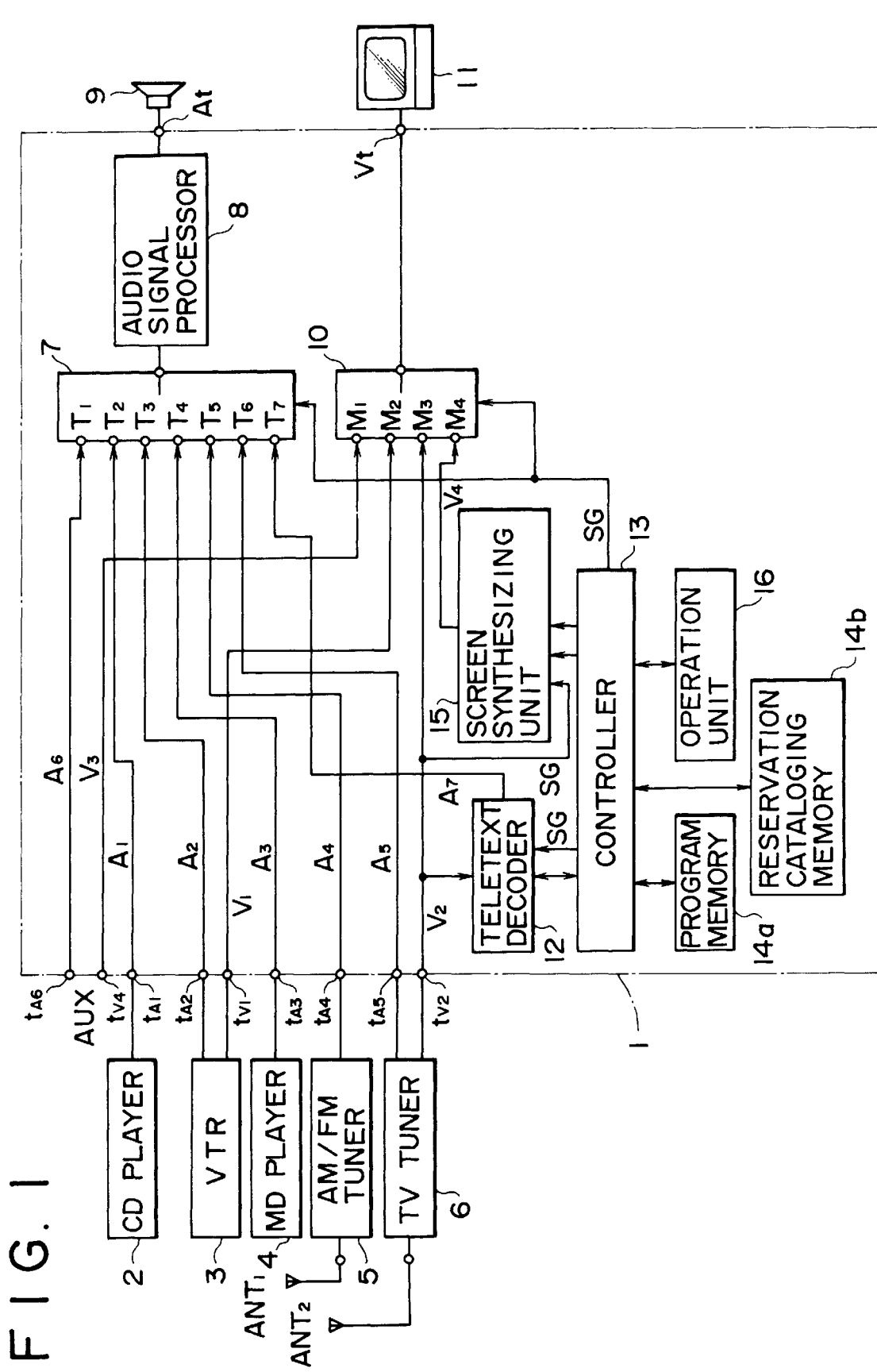
FIG. 1 is a diagram showing an overall configuration of an audio/video system selector provided by the present invention.

FIG. 1 is a block diagram showing circuit components constituting an AV amplifier 1 with a teletext receiving function as implemented by a first embodiment in accordance with the present invention. Functions of a selector provided by the present invention are embedded in the AV amplifier 1 having a teletext receiving facility.

As shown in the figure, external input apparatuses connected to the AV amplifier 1 with a teletext receiving function, where AV amplifier 1 is enclosed by a dotted line in the figure, are a compact disc player 2 referred to hereafter simply as a CD player, a video tape recorder 3 referred to hereafter simply as a VTR, a minidisk player 4 referred to hereafter simply as an MD player, an AM/FM tuner 5 and a television tuner 6 referred to hereafter simply as a TV tuner. The CD player 2 and the MD player 4 can play back audio signals from a compact disk and a minidisk respectively. Audio and/or video signals supplied by these external input apparatuses are selected by an audio select switch 7 or a video select switch 10 to be described later. An audio signal generated by an audio signal processing unit 8 is output to a speaker 9 through an audio output terminal At. On the other hand, a video signal is output to a display unit 11 through a video output terminal Vt.

The CD player 2 is connected to an audio input terminal $t_{A1}$ of the AV amplifier 1, supplying the audio signal select switch 7 of the AV amplifier 1 with an audio signal $A_1$ played back from a CD.

The VTR 3 is connected to an audio input terminal $t_{A2}$ and a video input terminal $t_{V1}$, of the AV amplifier 1, supplying the audio signal and video signal select switches 7 and 10 with an audio signal $A_2$ and a video signal $V_1$, respectively which are played back from a special cassette tape of typically a VHS system. The MD player 4 is connected to an audio input terminal $t_{A3}$ of the AV amplifier 1, supplying the audio signal select switch 7 with an audio signal $A_3$ played back from a special minidisk such as an optical disk or a magneto-optic disk. The audio signal $A_3$ is audio data obtained by reproducing digital data recorded in the minidisk.

The AM/FM tuner 5 is connected to an audio input terminal $t_{A4}$ of the AV amplifier 1, supplying the audio signal select switch 7 of the AV amplifier 1 with an audio signal $A_4$ of a selected broadcast program received by an antenna $ANT_1$. The TV tuner 6 is connected to an audio input terminal $t_{A5}$ and a video input terminal $t_{V2}$ of the AV amplifier 1, supplying the audio signal and video signal select switches 7 and 10 respectively with an audio signal $A_5$ and a video signal $V_2$ of a selected broadcast program received by an antenna $ANT_2$.

An audio input terminal $t_{A6}$ and a video input terminal $t_{V4}$ are provided as auxiliary input terminals so that additional external input apparatuses can be connected to the AV amplifier 1 through these auxiliary input terminals. It should be noted that the auxiliary input terminals can be checked for connection with external input apparatuses. For example, when only the audio input terminal $t_{A6}$ is connected to an additional external input apparatus, control is carried out so as not to select a signal supplied to the video input terminal $t_{V4}$ by a selection operation to be described later.

The teletext decoder 12 demodulates characters superimposed on a predetermined line in the vertical blanking period of a video signal received and demodulated by the TV tuner 6.

The demodulated character data is supplied once to a controller 13. In addition, audio data added to the character data is also demodulated and supplied to the audio signal select switch 7 as an audio signal $A_7$. The controller 13 is a microcomputer which serves as a control unit. The controller 13 outputs control signals SG for controlling the operations of the other components.

The controller 13 supplies the demodulated teletext data as it is to a screen synthesizing unit 15 for synthesizing a video signal of a teletext program. In addition, the controller 13 can also store demodulated character and audio data temporarily in a program memory unit 14a. The data is read out later at time the user wants to watch and listen to it. In this case, the character data is supplied to the screen synthesizing unit 15 in which the character data is synthesized with the video data while the audio data is supplied to the audio signal select switch 7 through the teletext decoder 12.

The output of the screen synthesizing unit 15 is supplied to a terminal $M_4$ of the video signal select switch 10 as a video signal $V_4$. When the user watches and listens to a teletext program, the controller 13 connects the video signal select switch 10 to the terminal $M_4$. In this way, a video signal of the teletext synthesized in the screen synthesizing unit 15 can be output to the monitor unit 11.

An audio signal is selected from audio signals $A_1$ to $A_7$ supplied by the external input apparatuses and the teletext decoder 12 by the audio signal select switch 7 in a select control operation to be described later. The selected signal undergoes various kinds of signal processing carried out by the audio signal processing unit 8 and is amplified thereby before being output to a speaker 9 installed externally through an audio output terminal At. Likewise, a video signal is selected from video signals $V_1$ to $V_4$ supplied by the input apparatuses and the screen synthesizing unit 15 by the video signal select switch 10 and output to the monitor unit 11 through a video output terminal Vt.

In this case, when the VTR 3 or the TV tuner 6 is selected for example, the audio signal select switch 7 and the video signal select switch 10 operate synchronously to switch in both audio and video signals at the same time.

In addition, as will be described later in detail, when a teletext program is selected as a source, control is executed so that the audio signal select switch 7 remains in a state of sustaining an audio signal selected so far and only the video signal select switch 10 operates to select the teletext, allowing pictures of the teletext program to be displayed on the monitor unit 11.

It should be noted that there are several ways of implementing electrical communication between the AV amplifier 1 and the monitor unit 11, typically a TV receiver. For example, the video signals $V_1$ to $V_4$ are supplied by the AV amplifier 1 to the monitor unit 11 as RF signals, component video signals, Y/C (Luminance/Chroma) video signals or RGB (Red, Green and Blue) signals. The configuration of an output circuit system at the front stage varies depending upon the way signals are supplied to the monitor unit 11. Detailed description of the output circuit is omitted though.

An operation unit 16 has operation keys used by the user for selecting a teletext program and for manually cataloging a recording reservation.

In order to select a teletext program, first of all, the user presses a channel operation key to select a broadcast station channel. As a channel is selected by the user, the controller 13 controls the reception frequency of the TV tuner 6 accordingly.

In addition, the user selects a program number after a channel has been selected. Typically, the ten keys "0" to "9" and a "#" key are provided for selecting a channel number. For example, when the user presses the "1", "2", "3" and "#" keys, a program number "123#" is specified. The controller 13 then lets the teletext decoder 12 execute demodulation of a teletext signal of a program specified by the program number "123#".

In addition, the operation unit 16 typically has a reservation mode key and a reservation set key, operation keys used for cataloging a reservation.

For example, the user specifies the channel number "1" and the program number "156#" and then pushes the reservation set key after pressing the reservation mode key. In this case, the controller 13 recognizes that a program with the number "156#" of Channel 1 is to be reserved and the reservation is to be cataloged. The channel number "1" and the program number "156" are stored in a reservation cataloging memory unit 14b as reservation/cataloging data.

As such, the reservation cataloging memory unit 14b is used for storing reservation/cataloging data set by operations carried out by the user.

With a program number and a channel number stored in the reservation cataloging memory unit 14b as described above, the controller 13 stores the contents of the program of the channel resulting from demodulation carried out by the teletext decoder 12 in a program memory unit 14a when the program is received.

The program memory unit 14a has a storage capacity which is large enough for storing typically up to 300 pages of teletext contents.

By storing a reserved program in the program memory unit 14a as described above, the user can watch the program by carrying out a program number specifying operation at any time the user wants to watch the program. At that time, the controller 13 immediately reads out the contents of the program from the program memory unit 14a, displaying pictures of the program on the monitor unit 11. At the same time, an audio signal is output to the speaker 9.

Figure 2:
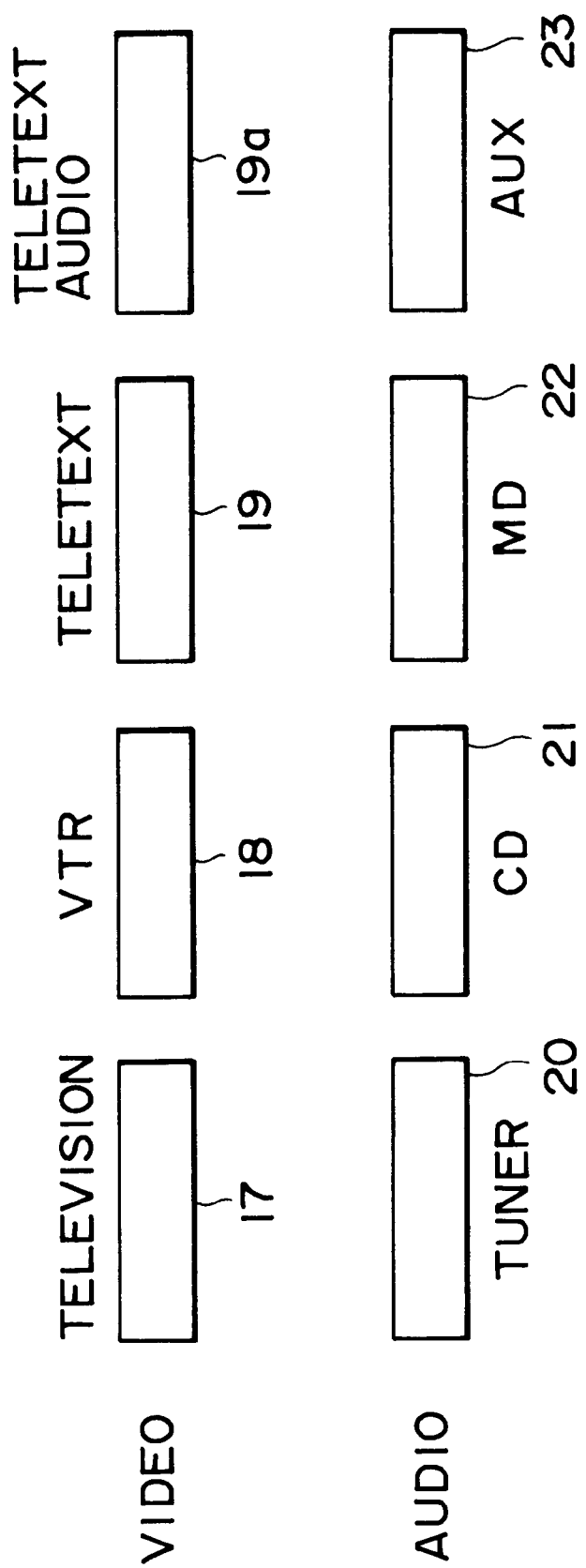
FIG. 2 is an outline diagram showing an operation unit provided on the selector shown in FIG. 1.

FIG. 2 is a diagram showing the operation keys provided on the operation unit 16. The figure shows only the switching keys for selecting inputs to the audio signal select switch 7 and the video signal select switch 10.

The keys shown on the upper row of the diagram are a TV key 17 and a VTR key 18 which are associated with the TV tuner 6 and the VTR 3 respectively. By pressing a key, audio and video signals supplied by the source associated with the key can be switched in at the same time. To put it in more detail, for example, when the TV key 17 is pressed, the audio signal select key 7 is connected to a terminal $T_6$ and the video signal select key 10 is connected to a terminal $M_3$, selecting and outputting an audio signal $A_5$ and a video signal $V_2$ generated by the TV tuner 6. Likewise, when the VTR key 18 is pressed, the audio signal select key 7 is connected to a terminal $T_3$ and the video signal select key 10 is connected to a terminal $M_2$, selecting and outputting an audio signal $A_2$ and a video signal $V_1$ generated by the VTR 3.

When a teletext key 19 is pressed with another source already selected, control is carried out so that the audio signal select switch 7 is not operated and only the video signal select switch 10 is connected to a terminal $M_4$. That is to say, a teletext such as a weather forecast or traffic information is displayed on the screen unit 11 while the audio signal generated by the other already selected source remains selected as it is.

When a teletext audio key 19a is pressed in the state described above, the audio signal select switch 7 is switched over to a terminal $T_7$ to select an audio signal $A_7$ output from the teletext decoder 12.

It should be noted that the teletext key 19 and the teletext audio key 19a can be replaced by a single key. In such a scheme, pressing the single key for the first time will select a teletext program with the audio signal generated by the other already selected source remaining selected as it is as described above. When the single key is pressed again in this state, the audio signal select switch 7 is switched over to the terminal $T_7$ to select the audio signal $A_7$ output from the teletext decoder 12 in place of the audio signal generated by the other already selected source. As an alternative, when the user keeps pressing the single key continuously for a period longer than a predetermined time, the audio signal select switch 7 is switched over to the terminal $T_7$ to select the audio signal $A_7$ output from the teletext decoder 12 as described above.

A tuner key 20, a CD key 21, an MD key 22 and an AUX key 23 shown on the lower row in the figure are associated with the AM/FM tuner 5, the CD player 2, the MD player 4 and the auxiliary terminal $t_{V4}$ respectively. By pressing one of the keys, an audio signal generated by the source associated with the pressed key can be selected.

For example, when the tuner key 20 is pressed, the audio signal select switch 7 is connected to a terminal $T_5$ to select and output an audio signal $A_4$ generated by the AM/FM tuner 5. Likewise, when the CD key 21 is pressed, the audio signal select switch 7 is connected to a terminal $T_2$ to select and output an audio signal A1 generated by the CD player 2 and when the MD key 22 is pressed, the audio signal select switch 7 is connected to a terminal $T_4$ to select and output an audio signal $A_3$ generated by the MD player 4.

When the AUX key 23 is pressed, control is executed so that, for example, the audio signal select switch 7 is connected to a terminal $T_1$ and the video signal select switch 10 is connected to a terminal $M_1$. If only the audio input terminal $t_{A6}$ is connected to an additional input apparatus, then only the audio signal select switch 7 is connected to the terminal $T_1$.

Video and audio signals selected by pressing the operation keys described above are explained below. It should be noted that an example is given in the explanation, in which example the operation keys shown in a table are pressed one after another in a top-down order.

FIG. 3 is a diagram showing a rough model of operations wherein an audio signal of a teletext program is selected by pressing the teletext audio key 19a.

First of all, the VTR key 18 is pressed as is shown in FIG. 3A to select the video signal $V_1$ and the audio signal $A_2$ generated by the VTR 3. In this state, the TV key 17 is then pressed as is shown in FIG. 3B to operate the audio signal select switch 7 as well as the video signal select switch 10 so that the video signal $V_2$ and the audio signal $A_5$ produced by the TV tuner 6 are selected in place of the video signal V1 and the audio signal $A_2$ generated by the VTR 3. Then, in this state, the MD key 22 is pressed as is shown in FIG. 3C to operate only the audio signal select switch 7 so that the audio signal $A_3$ produced by the MD player 4 is selected in place of the audio signal $A_5$ produced by the TV tuner 6 with the video signal $V_2$ from the TV tuner 6 remaining selected as it is.

Likewise, in this state, the CD key 21 is pressed as is shown in FIG. 3D to operate only the audio signal select switch 7 so that the audio signal $A_1$ produced by the CD player 2 is selected in place of the audio signal $A_3$ produced by the MD player 4 with the video signal $V_2$ generated by the TV tuner 6 remaining selected as it is.

Then, in this state, the teletext key 19 is pressed as is shown in FIG. 3E to operate only the video signal select switch 10 so that the video signal $V_4$ of a teletext program is selected in place of the video signal $V_2$ produced by the TV tuner 6 with the audio signal A1 produced by the CD player 2 remaining selected as it is. That is to say, since the user wants to watch data of the teletext such as a weather forecast or traffic information displayed on the screen of the display unit 11 only for a short time, suspension of the audio signal being output in an effort made to display only the data of the teletext on the screen will adversely give rise to an unpleasant feeling. For this reason, when the teletext key 19 is pressed, only the video signal select switch 10 is reconnected to the terminal $M_4$ so that the video $V_4$ of the teletext is selected with the previously selected audio signal remaining selected as it is.

Then, in this state, the teletext audio key 19a is pressed as is shown in FIG. 3F to change only the connection of the audio signal select switch 7 to the terminal $T_7$. If audio information exists in the teletext program, the video signal $V_4$ and the audio signal $A_7$ are now selected.

FIG. 4 shows an example outlining operations carried out in a configuration in which the function of the teletext audio key 19a is performed also by the teletext key 19. In the rough model shown in the figure, the teletext key 19 is pressed again in a state wherein a teletext program has already been selected.

For example, the tuner key 20 is pressed as is shown in FIG. 4A to output only the audio signal $A_4$ generated by the AM/FM tuner 5. In this state, the CD key 21 is then pressed as is shown in FIG. 4B to select only the audio signal $A_1$ generated by the CD player 2 in of the audio signal $A_4$ generated by the AM/FM tuner 5. Then, in this state, the teletext key 19 is pressed as is shown in FIG. 4C to switch the video signal select switch 10 to the terminal $M_4$ to select and output the video signal $V_4$ of a teletext with the audio signal A1 generated by the CD player 2 remaining selected as it is.

Likewise, in this state, the teletext key 19 is pressed again as is shown in FIG. 4D to switch only the audio signal select switch 7 to the terminal $T_7$ as described above so that the audio signal $A_7$ and the video signal $V_4$ of the teletext are selected and output with the audio signal $A_7$ replacing the audio signal A1 generated by the CD player 2. If the teletext key 19 is pressed once more in this state as is shown in FIG. 4D, again, only the audio signal select switch 7 is operated. In this case, the audio signal prior to the selection of the audio signal $A_7$ can be re-selected so that the audio signal $A_1$ generated by the CD player 2 and the video signal $V_4$ of the teletext are selected as shown in FIG. 4E.

In addition, as an alternative, when the user keeps pressing the teletext key 19 continuously for a period longer than a predetermined time with the audio signal $A_1$ generated by the CD player 2 and the video signal $V_4$ of the teletext selected as shown in FIG. 4C, the audio signal $A_7$ of the teletext program is re-selected and output with the video signal $V_4$ remaining selected as shown in FIG. 4D.

As described above, when it is desired to watch a teletext program only for a short period of time, only the screen of the teletext program can be selected and output by the carrying out the operation just once. As a result, the output of a CD or MD player is not interrupted, allowing the user to take advantage of the merit of a teletext of fully obtaining information from pictures displayed on the screen while listening to the uninterrupted output of a CD or MD player as background music.

In the example of operations of the embodiment described above, the AV amplifier 1 is switched from an audio apparatus to a teletext receiver. It is needless to say that the present invention 1 can also be applied to switching of the AV amplifier 1 from a video apparatus to the teletext receiver.

As described above, in this embodiment, the audio signal of a teletext can be selected by pressing the teletext audio key 19a, pressing the teletext key 19 twice or pressing the teletext key 19 continuously for a period longer than a predetermined time. It should be noted that, as an alternative, control can be carried out so that, when the teletext key 19 is pressed, both the audio signal select switch 7 and the video signal select switch 10 are operated simultaneously to select the audio signal $A_7$ and the video signal $V_4$ respectively of the teletext. In this way, the user can listen to the audio signal $A_7$ and watch the video signal $V_4$ at the same time by carrying out the operation only once.

As described above, the selector provided by the present invention allows the user to switch only the screen of the display unit to pictures of a teletext by carrying out an operation once, keeping an already selected audio signal output as it is when the teletext is selected while the audio signal of an already selected source is being output.

Thus, there is no need to carry out an operation for re-selecting an audio signal output by a source such as a CD or MD player after the teletext has been selected. As a result, the output of a CD or MD player is not interrupted, allowing the user to take advantage of the merit of a teletext of fully obtaining information from pictures displayed on the screen while listening to the uninterrupted output of a CD or MD player as background music.

What is claimed is:

1. A component system, comprising: reception means for receiving a teletext program; a teletext decoder for demodulating a teletext video signal and an audio signal of the teletext program received by said reception means;

a plurality of audio components for demodulating audio signals;

a plurality of video components for demodulating video signals;

audio signal selecting means for selecting an audio signal from among a plurality of outputs of said plurality of audio components and said plurality of video components and said teletext decoder;

video signal selecting means for selecting a video signal from among a plurality of outputs of said plurality of audio components and said plurality of video components and said teletext decoder;

source selecting means operated by a user of the system for selecting one component from among said plurality of audio components and said plurality of video components and said teletext decoder; and control means connected to said teletext decoder, said audio signal selecting means, said video signal selecting means, and said source selecting means whereby, when said source selecting means is operated to select said teletext decoder in place of one of said plurality of audio components and said plurality of video components previously selected, only said video signal selecting means is controlled to select the teletext video signal output by said teletext decoder and control is exercised so as to sustain an audio signal output by said one of said plurality of audio components and said plurality of video components previously selected.

2. The component system according to claim 1 wherein said source selecting means includes a manual operation unit for requesting selection of an audio signal output by said teletext decoder.

3. The component system according to claim 2 wherein an audio signal output by one of said plurality of audio components previously selected by said source selecting means and an audio signal output by said teletext decoder are selected alternately in accordance with successive operations of said operation unit included in said source selecting means for selecting said teletext decoder.

4. The component system according to claim 3 wherein said audio signal output by said teletext decoder is selected in place of said audio signal output from said audio component previously selected depending upon a length of time for which said operation unit included in said source selecting means for selecting said teletext decoder is operated.

5. The component system according to claim 1 having:

a first mode wherein, when said source selecting means is requested to select said teletext decoder in place of one of said plurality of audio components and said plurality of video components previously selected, said video signal selecting means is controlled to select a video signal output by said teletext decoder and wherein further control is exercised by said control means so as to sustain an audio signal output by either one of said plurality of audio components or said plurality of video components previously selected; and a second mode wherein, when said source selecting means is requested to selected said teletext decoder in place of one of said plurality of audio components and said plurality of video components previously selected, said video signal selecting means is controlled to select a video signal output by said teletext decoder and said audio signal selecting means is controlled to select an audio signal output by said teletext decoder.

6. Apparatus connected to a plurality of audio components, a plurality of video components and a teletext decoder for demodulating a video signal and an audio signal of a teletext program wherein an audio signal and a video signal output by said plurality of audio components and said plurality of video components can be selected, said apparatus comprising:

audio signal selecting means for selecting an audio signal from among a plurality of outputs of said plurality of audio components and said plurality of video components and said teletext decoder;

video signal selecting means for selecting a video signal from among a plurality of outputs of said plurality of audio components and said plurality of video components and said teletext decoder;

source selecting means for selecting one component from among said plurality of audio components and said plurality of video components and said teletext decoder; and control means connected to said teletext decoder, said audio signal selecting means, said video signal selecting means, and said source selecting means whereby, when said source selecting means is requested to select said teletext decoder in place of one each of said plurality of audio components and said plurality of video components previously selected, only said video signal selecting means is controlled to select a video signal output by said teletext decoder and control is exercised so as to sustain an audio signal output by either one of said plurality of audio components or said plurality of video components previously selected.

7. The apparatus according to claim 6 wherein said source selecting means includes an operation means for requesting selection of an audio signal output from said teletext decoder.

8. The apparatus according to claim 7 wherein an audio signal output by one of said plurality of audio components previously selected and an audio signal output by said teletext decoder are selected alternately in accordance with successive operations of operation means of said said source selecting means for selecting said teletext decoder.

9. The apparatus according to claim 8 wherein said audio signal output by said teletext decoder is selected in place of said audio signal output by said audio component previously selected depending upon a length of time for which said operation means included in said source selecting means for selecting said teletext decoder is operated.

10. The apparatus according to claim 6 having:

a first mode wherein, when said source selecting means is requested to select said teletext decoder in place of one said plurality of audio components and said plurality of video components previously selected, said video signal selecting means is controlled to select a video signal output by said teletext decoder and wherein further control is exercised by said control means so as to sustain an audio signal output by either one of said plurality of audio components or said plurality of video components previously selected; and a second mode wherein, when said source selecting means is requested to select said teletext decoder in place of one of said plurality of audio components and said plurality of video components previously selected, said video signal selecting means is controlled to select a video signal output by said teletext decoder and said audio signal selecting means is controlled to select an audio signal output by said teletext decoder.

* * * * *